UNITED STATES PATENT OFFICE.

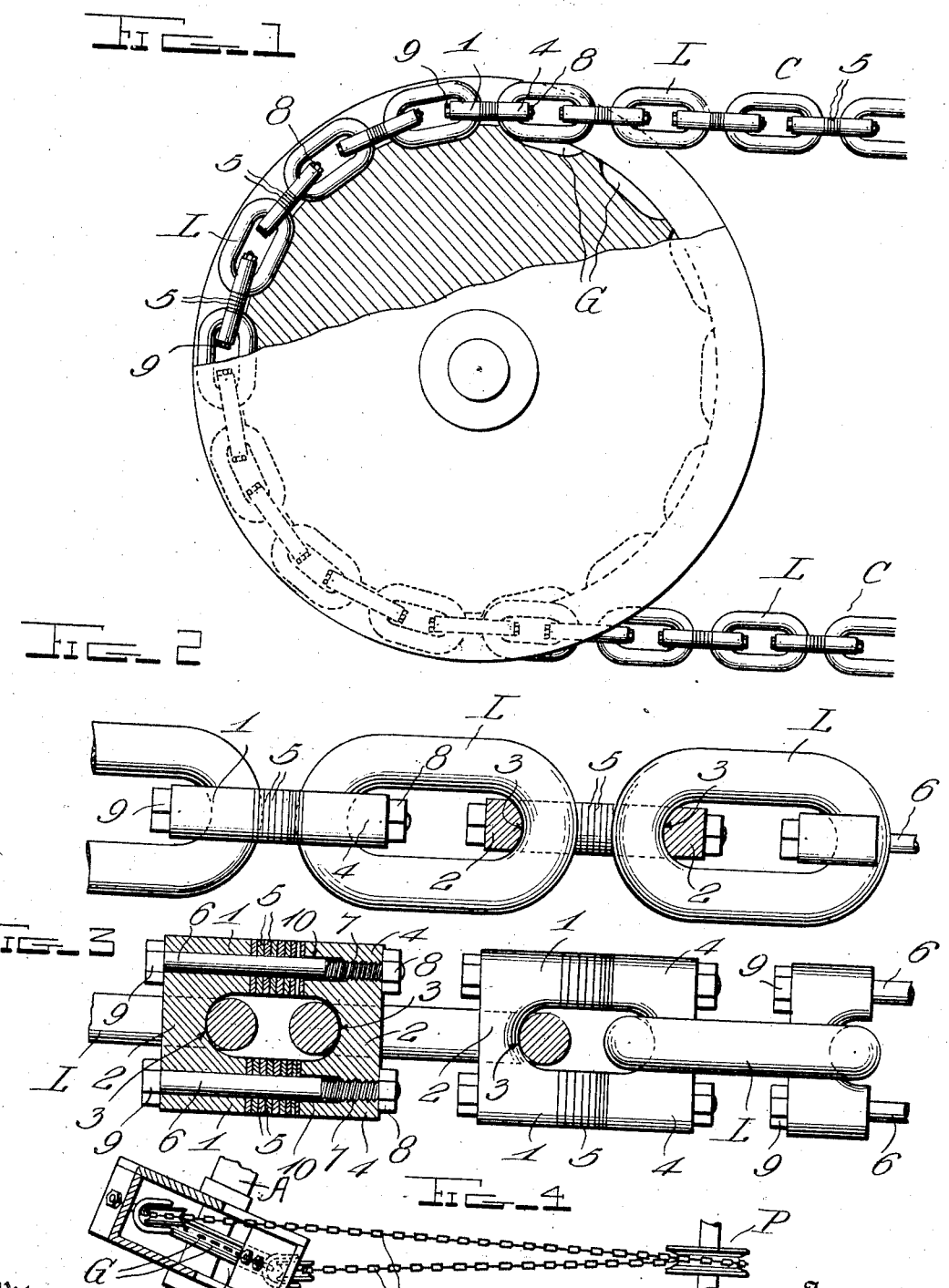

WALTER S. MORTON, OF PORTSMOUTH, OHIO.

DRIVING-CHAIN.

1,039,991.  Specification of Letters Patent.  Patented Oct. 1, 1912.

Application filed October 10, 1911. Serial No. 653,916.

*To all whom it may concern:*

Be it known that I, WALTER S. MORTON, a citizen of the United States, residing at Portsmouth, in the county of Scioto and State of Ohio, have invented certain new and useful Improvements in Driving-Chains; and I do declare the following to be a full, clear, and exact description of the invention, such as will enable others skilled in the art to which it appertains to make and use the same.

This invention relates to machine elements, and more especially to sprocket chains whereby power is transmitted from one wheel to another; and the object of the same is to improve the construction of such a chain and render certain of its links adjustable for the purpose of taking up wear without destroying the flexibility of the chain as a whole. This object is accomplished by constructing the chain as hereinafter more fully described and claimed, and as shown in the drawings wherein:

Figure 1 is a side elevation of a portion of my improved chain, showing it as engaging a pulley or wheel which is partly broken away; Fig. 2 is an enlarged side elevation of a few links of this chain, one of them being in section; Fig. 3 is a similar elevation and section, excepting that the chain is viewed in a direction at right angles to that from which the chain in Fig. 2 is viewed; Fig. 4 is a diagrammatic view showing a power sprocket and a driven sprocket, and illustrating how a chain of this improved construction may flex laterally when one of said sprockets is turned aside.

In the drawings the letter P designates a power sprocket and D a driven sprocket each having sockets G within its grooved periphery for engaging the driving chain by means of which power is communicated from the former to the latter sprocket; C designates the chain as a whole, L are solid links of any suitable construction disposed throughout the length of said chain and in a single plane with each other, and the links interposed between these solid links form the subject matter of my invention which will now be explained in detail. Each link of improved construction within this chain is formed of two members adjustably connected by two bolts, with removable washers strung upon the bolts between the members, and each member comprises two tubular elements integrally connected by a transverse yoke 2 having its inner face 3 between said elements curved both transversely and longitudinally to accommodate the corresponding curvature of the ordinary link L which engages this yoke. Said elements have their bores parallel with each other and standing at right angles to the length of said yoke, and the latter connects what might be called the outer ends of the elements so that each member of this link is substantially U-shaped in plan view as perhaps best seen at the center of Fig. 3. The bores through the elements of the left-hand member shown at the left of Fig. 3 are smooth so as to constitute eyes 1, whereas the bores through the elements of the right hand member are threaded so as to constitute nuts 4, and the axis of one nut is alined with the axis of the eye opposite as shown. Between the adjacent inner extremities of the elements referred to, at each side of my improved link, are disposed a number of thin washers 5. A bolt 6 is passed through each eye, through the group of washers, and screwed through the threads 7 in the nut opposite, and on its projecting extremity against the outer end of this element it preferably engages a lock nut 8 to prevent it from unscrewing, its head 9 bearing against the outer extremity of the opposite element containing the eye member as shown. By preference the inner end of the bore of each nut 4 is unthreaded as shown at 10, although this detail of construction is not necessary. By preference also the opposite bolt 6 is similarly disposed although it is clear that the eye member 1 and nut member 4 at this side of the link might be transposed so that the bolt 6 could be inserted in the opposite direction without departing from the spirit of my invention. Also the sizes, proportions, materials and exact details of construction are not necessary hereto, but are described as typical of the preferred manner in which my improved sprocket chain link is constructed.

In use the ordinary links L are connected up by these improved links by alternating the latter with the former in a manner which will be clear and passing the entire chain C around the driving sprocket P and the driven sprocket D as usual, and the disposition of parts may be such that the sockets G in said sprockets engage either the links L or my improved links although by preference I cause them to engage the ordinary links whose length is never adjusted. When now the chain becomes loose by reason of the wear of parts, and it is desired to reduce its length throughout the entire chain rather than by wholly removing a link, each lock nut 8 is removed, each bolt 6 is unscrewed from the threads 7 and withdrawn far enough to permit its threaded extremity to disengage the inner end of the nut 4, and one washer 5 is taken out of each group; after which the parts are replaced and tightened up, and it will be clear that the length of this link and the distance between its two curved faces, 3, 3 will be reduced by just the thickness of the washers removed. For this reason the latter should be made quite thin, although it is possible to make each group include a number of thick washers and a number of thin washers so long as those of either kind in one group are duplicates of those of the same kind in the other group.

Drive chains as a rule are designed with the purpose of flexing in only one direction, as when they pass around the driving and driven pulleys or sprockets, but I have designed this improved chain for use more especially in connection with the traction engine on which I am seeking Letters Patent by means of applications bearing Serial Numbers 653,914 and 653,915 and filed this day. In Fig. 4 of the drawings hereto attached are shown diagrammatically the power shaft P and its sprocket and the axle A and driven sprocket D thereon, forming part of a motor vehicle as described in my companion applications just referred to, and the power and driven sprockets are connected by a chain C which of necessity must flex laterally when the axle A is turned aside as herein indicated. Of course said chain flexes in an upright plane at all times when passing over the two sprockets and the guide pulleys herewith illustrated, but this view is given to show the utility of the rounded faces 3 which are curved both longitudinally and laterally.

What is claimed as new is:

1. The herein described drive chain link comprising two members each consisting of two tubular elements connected by a yoke, the bores in the elements of one member being smooth and constituting eyes and those in the elements of the other member being threaded and constituting nuts, bolts whose shanks pass loosely through said eyes and whose threaded portions engage the nuts and project beyond the elements containing the latter, nuts on the projecting ends of the bolts, and a series of washers interposed between the inner ends of the alined elements and strung on the bolts.

2. The herein described drive chain link comprising two members each consisting of two parallel tubular elements integrally connected at their outer ends by a yoke having its inner face curved longitudinally and laterally, the bore of one element being smooth and the opening through the element opposite thereto registering with said bore and being internally threaded, a bolt whose smooth shank passes loosely through said smooth bore and whose threaded portion engages said threaded opening, a parallel bolt similarly connecting the elements at the opposite side of the link, and a series of washers strung on each bolt.

3. The herein described drive chain link comprising two members each consisting of two parallel tubular elements integrally connected at their outer ends by a yoke having its inner face curved longitudinally and laterally, the bore of one element being smooth and the opening through the element opposite thereto registering with said bore and being internally threaded at its outer end and smooth at its inner end, a bolt whose smooth shank passes loosely through said smooth bore and its threaded end passes through the smooth portion of said opening and engages the threaded portion, a parallel bolt similarly connecting the elements at the opposite side of the link, and a series of washers of variable thickness strung on each bolt.

In testimony whereof I have hereunto set my hand in presence of two subscribing witnesses.

WALTER S. MORTON.

Witnesses:
LEON F. MILLER,
HARRY W. KEENY.